United States Patent [19]

Scott

[11] 4,125,279
[45] Nov. 14, 1978

[54] LOCKABLE HOSE COUPLING

[75] Inventor: Daniel G. Scott, Wilkinsburg, Pa.

[73] Assignee: Westinghouse Air Brake Company, Wilmerding, Pa.

[21] Appl. No.: 817,651

[22] Filed: Jul. 21, 1977

[51] Int. Cl.² .................... B60D 1/08; F16L 35/00
[52] U.S. Cl. .................................. 285/69; 285/88
[58] Field of Search .............. 285/69, 68, 88, 87, 285/319, DIG. 22, 320

[56] References Cited

U.S. PATENT DOCUMENTS

| 109,695 | 11/1870 | Westinghouse, Jr. | 285/319 |
| 891,718 | 6/1908 | McMillan | 285/69 X |
| 913,811 | 3/1909 | Clasen | 285/69 |
| 1,118,107 | 11/1914 | Clasen | 285/69 X |
| 1,249,074 | 12/1917 | Haldeman | 285/69 |
| 3,892,431 | 7/1975 | Booth | 285/79 |

FOREIGN PATENT DOCUMENTS

| 369,853 | 2/1923 | Fed. Rep. of Germany | 285/69 |
| 388,777 | 1/1924 | Fed. Rep. of Germany | 285/69 |
| 831,472 | 2/1952 | Fed. Rep. of Germany | 285/320 |
| 538,964 | 8/1941 | United Kingdom | 285/320 |

Primary Examiner—Thomas F. Callaghan
Attorney, Agent, or Firm—R. S. Visk; R. W. McIntire, Jr.

[57] ABSTRACT

This invention relates to a hose coupling on the body of which is rockably mounted intermediate its ends a locking member, one end of which constitutes an operating handle. The other end of this locking member is of such a configuration as to constitute a stop which is manually rockable by the operating handle out of the pathway of the guard arm of the other one of a pair of hose couplings to be manually coupled prior to rotating the two hose couplings to the fully coupled position. The configuration of the stop is such that, upon the pair of hose couplings reaching their fully coupled position, this stop will be disposed in such a position in the pathway of the guard arm of the other one of the pair of fully coupled hose couplings as to prevent unwanted uncoupling of the two coupled hose couplings. Upon manual rocking of the locking member in one direction by the operating handle, the stop will be lifted out of the pathway of the guard arm of the other one of the pair of coupled hose couplings. With the stop at the other end of the locking member rockably mounted on each respective one of the pair of coupled hose couplings rocked out of the pathway of the guard arm on the other hose coupling, the two hose couplings may be manually uncoupled one from the other.

10 Claims, 3 Drawing Figures

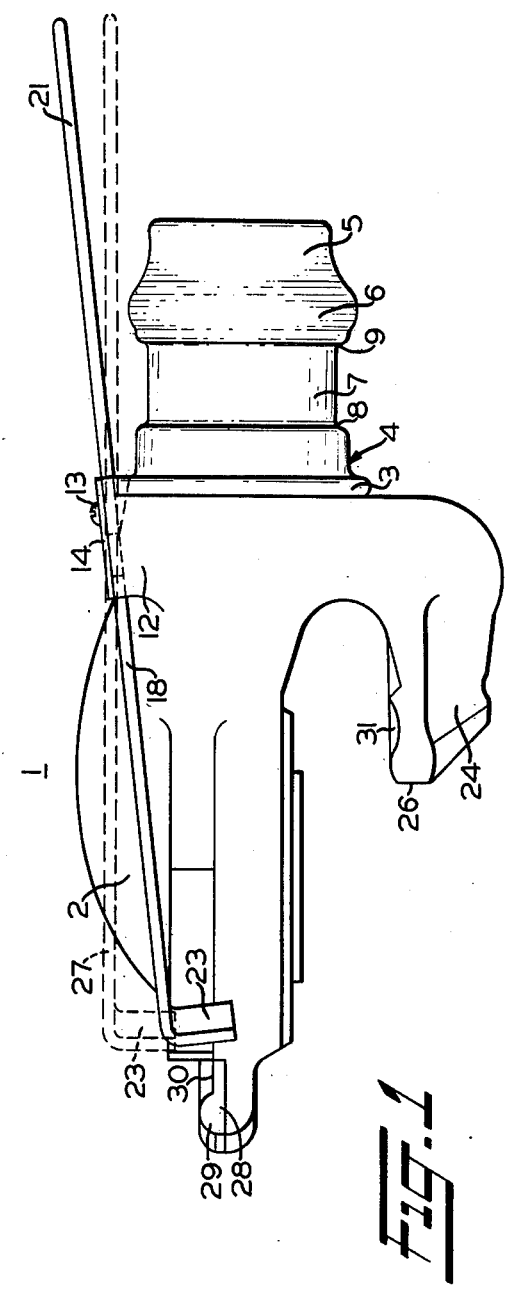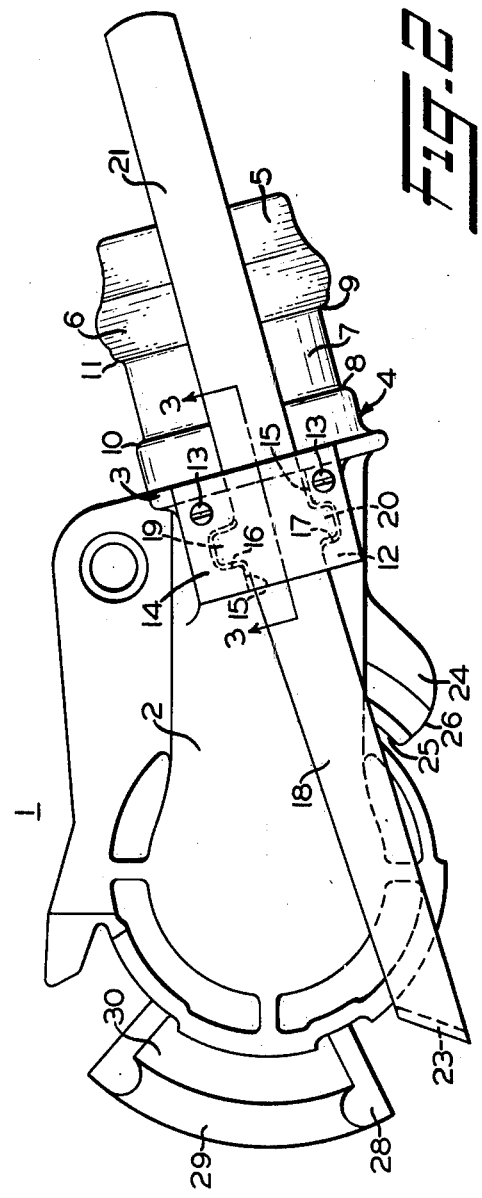

LOCKABLE HOSE COUPLING

BACKGROUND OF THE INVENTION

In U.S. Pat. No. 458,542, issued Aug. 25, 1891 to Thomas W. Welsh, and assigned to the assignee of the present application, there is shown and described a pair of pipe or hose couplings, the construction and manual operation of which is substantially the same as the hose couplings used on the rolling stock owned by the American railroads to couple the air hoses at the adjacent ends of each pair of railway vehicles in a train to form a continuous train brake pipe that extends from the locomotive to the back end of the last car in the train. Unwanted uncoupling of a pair of coupled hose couplings may occur as the result of a piece of flying ballast, or other object, striking one of the couplings with a force of such magnitude that the struck coupling is rotated, relative to the other coupling, a sufficient amount to cause uncoupling of the two coupled hose couplings. Such an unwanted uncoupling of the two coupled hose couplings effects a release of fluid under pressure from the train brake pipe at an emergency rate which causes an undesired emergency brake application to be effected on each vehicle in the train thereby bringing the train to a stop. Such an undesired stop increases the time for the train to travel between two terminals and, therefore, causes an increase in the cost of operating the train.

Accordingly, it is the general purpose of this invention to provide a novel hose coupling on the exterior of the hollow body of which is rockably mounted intermediate its ends a locking member, one end of which constitutes an operating handle. The other end of this locking member is of such a configuration as to constitute a stop which is manually rockable by the operating handle out of the pathway of the guard arm of the other one of a pair of hose couplings to be manually coupled prior to rotating the two hose couplings to their fully coupled position. The configuration of the stop is such that, when the two hose couplings reach their fully coupled position, it will be so disposed in the pathway of the guard arm of the other one of the pair of fully coupled hose couplings as to prevent unwanted uncoupling of the two coupled hose couplings.

SUMMARY OF THE INVENTION

According to the present invention, rockably mounted on the exterior of the hollow body of a hose coupling intermediate the ends thereof is a spring-biased locking member, one end of which constitutes an operating handle. The other end of this locking member is bent to such a configuration that it constitutes a stop which is manually rockable by the operating handle out of the pathway of the guard arm of the other one of a pair of hose couplings to be manually coupled prior to rotating the two hose couplings, each relative to the other, to the fully coupled position. The configuration of the stop is such that, upon the pair of hose couplings reaching their fully coupled position, this stop will be disposed in such a position in the pathway of the guard arm of the other one of the pair of fully coupled hose couplings as to prevent unwanted uncoupling of the two coupled hose couplings by such, as for example, a piece of flying ballast. Upon manual rocking of the locking member in one direction by the operating handle, the stop will be lifted out of the pathway of the guard arm of the other one of the pair of coupled hose couplings. With the stop at the other end of the locking member rockably mounted on each respective one of the pair of coupled hose couplings rocked out of the pathway of the guard arm on the other hose coupling, each of the two coupled hose couplings may be manually rotated with respect to the other until each of the two hose couplings may be moved away from the other thereby effecting a complete uncoupling of the two hose couplings.

In the accompanying drawing:

FIG. 1 is an elevational view of a hose coupling embodying the invention.

FIG. 2 is a top view of the hose coupling shown in FIG. 1.

FIG. 3 is a partial vertical cross-sectional view, taken along the line 3—3 of FIG. 2 and looking in the direction of the arrows, showing certain structural details not made apparent in FIGS. 1 and 2.

DESCRIPTION

As shown in FIGS. 1 and 2, a novel hose coupling 1 comprises a hollow body 2 that has formed integral therewith at the right-hand side of a hose stop 3 a nipple 4, it being apparent from FIG. 2 that the center line of this nipple 4 forms an obtuse angle with the horizontal center line of the hollow body 2.

The nipple 4 comprises a hose-receiving end or lip 5 at the left-hand end of which is an annular bead 6. This bead 6 has a smooth rounded contour for facilitating the application of a hose onto the nipple 4.

As shown in FIGS. 1 and 2, a shallow annular groove 7 is formed in the sealing portion of the nipple 4 substantially midway between the two ends of the nipple and has two oppositely facing shoulders 8 and 9 at the respective ends thereof. These shoulders 8 and 9 have rounded edges 10 and 11, it being noted that the rounded edge 11 extends from the shoulder 9 to the annular bead 6.

A hose (not shown) is forced over the lip 5, the bead 6 and groove 7 until the end of this hose abuts the hose stop 3. The hose is then secured to the nipple 4 by a band or hose clamp (not shown) which is applied by a suitable hose clamping machine, such as that disclosed in U.S. Pat. No. 2,729,994, issued to Ellis E. Hewitt et al on Jan. 10, 1956, reissued as U.S. Reissue Pat. No. 24,636 on Apr. 21, 1959, and assigned to the assignee of the present invention.

According to the present invention, the hollow body 2 has cast integral therewith on the exterior thereof a mounting boss 12. This boss 12 is provided with two spaced-apart screw-threaded bottomed bores (not shown) for receiving therein a pair of screws 13 that extend through a pair of spaced-apart smooth bores (not shown) provided in a flat rectangular leaf spring member 14 which is secured to the mounting boss 12 by these screws.

Formed in the top of the mounting boss 12 is a longitudinal groove 15 and a pair of transverse grooves 16 and 17. The depth of these transverse grooves 16 and 17 is the same as the depth of the longitudinal groove 15 and each intersects this groove 15 substantially midway the length thereof, as is apparent from FIG. 2.

As best shown in FIGS. 2 and 3 of the drawings, a locking member 18 extends through the longitudinal groove 15 in the mounting boss 12 and is disposed between the bottom of this groove 15 and the flat leaf spring member 14. The width of locking member 18 is slightly less than the width of groove 15.

It is apparent from FIG. 2 that the locking member 18 has formed integral therewith and extending from its opposite sides intermediate the ends thereof a pair of wings 19 and 20. The thickness of the locking member 18 and the wings 19 and 20 is substantially the same as the depth of the longitudinal groove 15 and the transverse grooves 16 and 17, it being apparent from FIG. 2 that the wing 19 is disposed in the transverse groove 16 and that the wing 20 is disposed in the transverse groove 17.

Moreover, it is apparent from FIG. 2 that the length and width of the wings 19 and 20 is slightly less than the length and width of the respective transverse grooves 16 and 17 in which they are disposed.

As shown in FIGS. 1 and 2, the locking member 18 is provided on the right-hand side of the wings 19 and 20 with a handle 21. This handle 21 enables manual clockwise rocking, as viewed in FIGS. 1 and 3, of the locking member 18 about a fulcrum 22 formed by the right-hand end of the longitudinal groove 15, as shown in FIG. 3.

As shown in FIG. 1, the left-hand end of the locking member 18 is bent through an angle of substantially ninety degrees to form a stop 23. While the locking member 18 is biased to its normal position in which it is shown in FIGS. 1, 2 and 3 by the leaf spring member 14, the stop 23 is so disposed as to lie in the pathway of travel of a guard arm 24 of the other end of a pair of hose couplings 1 when two of these hose couplings 1 are manually coupled together.

Accordingly, when the hose coupling 1 shown in FIGS. 1, 2 and 3, and having the locking member 18 secured thereto between the mounting boss 12 and the leaf spring member 14 by the screws 13, is moved toward the other one of a pair of hose couplings that are to be manually coupled, the stop 23 will be brought into abutting relationship with an arcuate surface 25 (FIG. 2) on the guard arm 24 of this other one of the pair of hose couplings.

Therefore, in order to bring the hose coupling 1 to the position, relative to this other one of the pair of couplings, in which this hose coupling 1 can be manually rotated, relative to this other one of the pair of hose couplings, to the fully coupled position, a trainman will, by the use of the palm of his hand as he grasps the hose coupling 1 with his fingers and thumb, depress the handle 21, as viewed in FIG. 1, of the locking member 18 carried by the hose coupling 1.

As the handle 21 is thus depressed by the trainman, it is effective to rock the locking member 18 clockwise, as viewed in FIG. 1, about the fulcrum 22 (FIG. 3).

It is apparent from FIG. 1 and 2 that as the locking member 18 is thus rocked clockwise about fulcrum 22 (FIG. 3), the stop 23 at the left-hand end of this locking member 18 will be lifted upward and out of abutting relationship with the arcuate surface 25 on the guard arm 24 of the other one of the pair of hose couplings that are to be manually coupled.

Accordingly, subsequent to lifting the stop 23 at the left-hand end of the locking member 18 carried by the hose coupling 1 upward and out of abutting relationship with the arcuate surface 25 on the guard arm 24 of the other one of the pair of hose couplings that are to be manually coupled, this hose coupling 1 can be so positioned that it may be manually rotated relative to the other one of the pair of hose couplings until the fully coupled position is reached.

Subsequent to the hose coupling 1 being rotated relative to the other one of the pair of hose couplings to the fully coupled position, the trainman will release his hand from the hose coupling 1 and the handle 21 of the locking member 18 of this coupling 1.

When the trainman thus releases his hand from the hose coupling 1 and the handle 21 of the locking member 18 carried by this hose coupling 1, the leaf spring member 14 is rendered effective to rock this locking member 18 counterclockwise, as viewed in FIG. 1, about the fulcrum 22 (FIG. 3) until the stop 23 and locking member 18 are returned to the position in which they are shown in FIG. 1. The stop 23 is now disposed at one side of one end 26 (FIG. 2) of the guard arm 24 of the other one of the pair of now fully coupled hose couplings.

It should be understood that this other one of the pair of hose couplings may be provided with a locking member 18 that is identical to the locking member 18 carried by the one hose coupling 1.

It should be further understood that the locking member 18 carried by this other one of the pair of hose coupling and the guard arm 24 of the one hose coupling 1 are operated in the manner described above when the two hose couplings are manually coupled by the trainman.

Therefore, it either one of the two fully coupled hose couplings is rotated, relative to the other one of these hose couplings, in the uncoupling direction, the edge of the stop 23 of the locking member 18 carried by the hose coupling being rotated will abut the end 26 on the guard arm 24 of the stationary hose coupling so that the two hose couplings cannot be uncoupled so long as this stop 23 abuts this end 26 on the guard arm 24 of the stationary hose coupling.

From the foregoing, it is apparent that while the stop 23 of the locking member 18 carried on each hose coupling abuts the end 26 on the guard arm 24 of the other hose coupling, neither of the hose couplings can be rotated, relative to the other, in the uncoupling direction to effect uncoupling of the two coupled hose couplings.

Accordingly, it is apparent that if a flying piece of ballast from a railroad roadbed, or some other object, strikes either one of the two coupled hose couplings and imparts a force to the struck hose coupling so that this force acts on this struck hose coupling in the direction to rotate it, relative to the other hose coupling, in the uncoupling direction, an unwanted uncoupling of the two hose couplings is not effected since the stop 23 carried by each of the hose couplings abuts the end 26 on the guard arm 24 of the other hose coupling. Thus, neither hose coupling can be rotated, relative to the other, in the uncoupling direction. Consequently, an unwanted uncoupling of the two coupled hose couplings by the piece of flying ballast, or other object, is prevented.

It should be understood that providing each of a pair of hose couplings 1 with a locking member 18 having a stop 23 does not prevent automatic uncoupling of two coupled hose couplings when the car couplers of two adjacent coupled cars are uncoupled and one car is pulled away from the other by a locomotive.

When one car is pulled away from the other, the abutting resilient gaskets carried in the two coupled hose couplings are compressed to permit automatic uncoupling, as in conventional hose couplings.

It should be noted that when one car is pulled away from the other by the locomotive, the stop 23 of the locking member 18 secured to the hose coupling that is attached to the outer end of the hose on the car being pulled away by the locomotive is moved away from the end 26 on the guard arm 24 of the hose coupling that is attached to the outer end of the hose at the adjacent end of the car that remains stationary.

Likewise, when one car is pulled away from the other, the end 26 on the guard arm 24 of the hose coupling that is attached to the outer end of the hose at the adjacent end of the car being pulled away by the locomotive, is moved away from the stop 23 of the locking member 18 that is carried by the hose coupling which is attached to the outer end of the hose at the adjacent end of the car that remains stationary.

Usually, a pair of coupled hose couplings are uncoupled automatically by a locomotive pulling one car away from the next adjacent car, as described above.

However, if two hose couplings 1 embodying the present invention are fully coupled, they may be manually uncoupled by a trainman in the manner now to be described.

The trainman will grasp one hose coupling with one of his hands and the other hose coupling with his other hand so that the palm of each of his hands abuts the handle 21 of the locking member 18 carried by the respective hose coupling and effects clockwise rocking, as viewed in FIG. 1, of the corresponding locking member 18 about its fulcrum 22 (FIG. 3).

As the locking member 18 carried by each hose coupling 1 is thus rocked clockwise, as viewed in FIG. 1, the stop 23 at the left-hand end of this locking member 18 will be lifted upward to the position indicated by dotted lines in FIG. 1 of the drawings and denoted by the numeral 27.

When the locking member 18 carried by each hose coupling is rocked to its raised position indicated by the numeral 27 in FIG. 1, the stop 23 at the left-hand end of the respective locking member 18 is lifted upward to a position in which it no longer abuts the end 26 on the guard arm 24 of the other one of the two coupled hose couplings.

Now, either one of the two hose couplings may be manually rotated relative to the other, in the uncoupling direction, until the uncoupled position is reached.

Thereafter, each of the hose couplings 1 may be manually moved away from the other to thereby effect a complete uncoupling of the two hose couplings.

It will be noted from FIGS. 1 and 2 that the hose coupling 1 has cast integral therewith a lip 28 provided with a lip bead 29 on which is formed a lip bearing surface 30. This lip 28, lip bead 29, and lip bearing surface 20 have the same shape and size and serve the same purpose as the lip, lip bead and lip bead bearing surface provided on conventional hose couplings now used on American railroads.

Furthermore, the guard arm 24 is provided with a guard arm groove 31 for receiving therein the lip bead 29 on the other one of a pair of hose couplings 1 when they are coupled together. This guard arm groove 31 has the same size and shape as the guard arm groove provided in the guard arm of conventional hose couplings.

From the foregoing, it is apparent that the hose couplings 1 embodying the invention can be manually coupled to a conventional air hose coupling.

Furthermore, these two hose couplings can be automatically uncoupled by a locomotive pulling one car away from another subsequent to uncoupling the car couplers at the adjacent ends of two coupled cars.

Having now described the invention, what I claim as new and desired to secure by Letters Patent, is:

1. A hollow hose coupling comprising:
    (a) a hollow body having integral therewith a lip provided with a lip bead on which is formed a lip bearing and a guard arm having a guard arm groove for receiving therein the lip bead of the other one of a pair of coupled hose couplings, wherein the improvement comprises:
    (b) a mounting boss fixed to the outside of said hollow body and having formed therein a longitudinal groove and a pair of coaxial transverse grooves disposed on the respective opposite sides of and intersecting said longitudinal groove,
    (c) a substantially flat leaf spring member secured to said mounting boss, and
    (d) a locking member disposed in and extending outward beyond each end of said longitudinal groove and having intermediate its ends a wing-like member extending from each side thereof into one of said pair of transverse grooves to prevent shifting of said locking member within said longitudinal groove, one end of said locking member having formed integral therewith a stop and the other end constituting a handle by which said locking member may be manually rocked in one direction to lift said stop out of the pathway of the guard arm of the other one of a pair of hose couplings to be manually coupled to enable rotation of either one of said pair of hose couplings, relative to the other, until said pair of hose couplings occupy their fully coupled positions, whereupon said leaf spring member is operative, in response to the release of said handle, to rock said locking member in a direction opposite said one direction to a position in which said stop in abuttingly disposed against one end of said guard arm of said other one of said pair of hose couplings thereby preventing unwanted relative rotation and consequent uncoupling of said pair of fully coupled hose couplings so long as said locking member is maintained in said position by said leaf spring member.

2. A hose coupling, as recited in claim 1, further characterized in that said mounting boss is cast integral with said hollow body.

3. A hose couplings, as recited in claim 1, further characterized by a pair of screws for removably securing said leaf spring member to said mounting boss.

4. A hose coupling, as recited in claim 1, further characterized in that the depth of said grooves and the thickness of said locking member are substantially the same.

5. A hose coupling, as recited in claim 1, further characterized in that one end of said longitudinal groove constitutes a fulcrum about which said locking member is rocked in said one direction by said handle and in said direction opposite said one direction by said leaf spring member.

6. A hose coupling, as recited in claim 1, further characterized in that the center line of said coaxial transverse grooves forms substantially a right angle with the center line of said longitudinal groove.

7. A hose coupling, as recited in claim 1, further characterized in that the length and width of said transverse grooves exceeds the length and width of said wings disposed therein to enable rocking of said locking member without binding of said wings within said transverse grooves.

8. A hose coupling, as recited in claim 1, further characterized in that said locking member comprises a flat metallic plate whereby said stop at said one end thereof is formed by bending said flat plate adjacent said one end.

9. A hose coupling, as recited in claim 3, further characterized in that said pair of screws are disposed on the same side of said wing-like members as said other end of said locking member thereby enabling said wing-like members to bend said leaf spring member about said screws upon manual rocking of said locking member in said one direction by said handle.

10. A hose coupling, as recited in claim 8, further characterized in that said stop forms substantially a right angle with said flat metallic plate.

* * * * *